(12) United States Patent
Bae et al.

(10) Patent No.: US 9,778,808 B2
(45) Date of Patent: Oct. 3, 2017

(54) TOUCH PANEL AND METHOD FOR MANUFACTURING THE SAME

(71) Applicant: Samsung Display Co., Ltd., Yongin (KR)

(72) Inventors: Joo-Han Bae, Seongnam-si (KR); Jin Hwan Kim, Seoul (KR); Hee Woong Park, Hwaseong-si (KR); Byeong Kyu Jeon, Busan (KR)

(73) Assignee: Samsung Display Co., Ltd., Yongin-si (KR)

( * ) Notice: Subject to any disclaimer, the term of this patent is extended or adjusted under 35 U.S.C. 154(b) by 213 days.

(21) Appl. No.: 14/515,241

(22) Filed: Oct. 15, 2014

(65) Prior Publication Data

US 2015/0160764 A1 Jun. 11, 2015

(30) Foreign Application Priority Data

Dec. 11, 2013 (KR) .................. 10-2013-0153830

(51) Int. Cl.
*G06F 3/044* (2006.01)
*G06F 3/045* (2006.01)

(52) U.S. Cl.
CPC .............. *G06F 3/045* (2013.01); *G06F 3/044* (2013.01); *G06F 2203/04102* (2013.01); *G06F 2203/04103* (2013.01)

(58) Field of Classification Search
CPC .......... G06F 3/044; G06F 2203/04103; G06F 3/0416; G06F 3/0412; G06F 3/041; G06F 3/047

USPC .................................................. 345/173–179
See application file for complete search history.

(56) References Cited

U.S. PATENT DOCUMENTS

| | | | | |
|---|---|---|---|---|
| 2005/0064618 A1* | 3/2005 | Brown | ................... | B82Y 10/00 438/49 |
| 2008/0143906 A1* | 6/2008 | Allemand | .............. | B82Y 10/00 349/43 |
| 2008/0259262 A1* | 10/2008 | Jones | ..................... | B82Y 10/00 349/139 |

(Continued)

FOREIGN PATENT DOCUMENTS

| JP | 5133449 | 11/2012 |
|---|---|---|
| JP | 2012-237746 | 12/2012 |

(Continued)

*Primary Examiner* — Kent Chang
*Assistant Examiner* — Sujit Shah
(74) *Attorney, Agent, or Firm* — H.C. Park & Associates, PLC

(57) ABSTRACT

A touch panel and a method for manufacturing the same, where the touch panel includes: a substrate; a first sensing electrode pattern disposed on the insulation substrate, including a plurality of first sensing electrodes, a first connection to connect the plurality of first sensing electrodes in a first direction, and a plurality of floating electrodes; and a second sensing electrode pattern including a plurality of second sensing electrodes insulated from the plurality of floating electrodes and overlapping the plurality of floating electrodes and a second connection to connect the plurality of second sensing electrodes in a second direction perpendicular to the first direction. The first sensing electrode pattern includes nanowire. The second sensing electrode pattern includes a transparent conductive material.

13 Claims, 16 Drawing Sheets

(56) References Cited

U.S. PATENT DOCUMENTS

| | | | | |
|---|---|---|---|---|
| 2009/0228131 A1* | 9/2009 | Wolk | | H01L 31/02246 700/103 |
| 2010/0045625 A1* | 2/2010 | Yang | | G06F 3/044 345/173 |
| 2011/0187673 A1* | 8/2011 | Yin | | G06F 3/044 345/174 |
| 2011/0207055 A1* | 8/2011 | Jun | | G06F 3/044 430/313 |
| 2011/0242019 A1* | 10/2011 | Jeong | | G06F 3/044 345/173 |
| 2012/0055013 A1* | 3/2012 | Finn | | H01Q 1/2225 29/600 |
| 2012/0073124 A1* | 3/2012 | Chien | | G06F 3/044 29/622 |
| 2012/0075243 A1* | 3/2012 | Doi | | G06F 3/044 345/174 |
| 2012/0094090 A1 | 4/2012 | Yamazaki et al. | | |
| 2012/0194448 A1* | 8/2012 | Rothkopf | | A45C 13/002 345/173 |
| 2012/0234663 A1* | 9/2012 | Hwang | | G06F 3/044 200/600 |
| 2012/0262409 A1* | 10/2012 | Tsai | | G06F 3/044 345/174 |
| 2013/0057497 A1* | 3/2013 | Cho | | G06F 3/044 345/173 |
| 2013/0063891 A1* | 3/2013 | Martisauskas | | G06F 1/1643 361/679.56 |
| 2013/0068602 A1* | 3/2013 | Reynolds | | H03K 17/962 200/600 |

FOREIGN PATENT DOCUMENTS

| | | |
|---|---|---|
| KR | 10-1049006 | 7/2011 |
| KR | 10-1096559 | 12/2011 |
| KR | 10-1169250 | 8/2012 |

* cited by examiner

FIG. 12

AgNW LINE RESISTANCE MEASUREMENT

| Line width \ Print | No Silver Rrint | Silver Rrint |
|---|---|---|
| 800μm | 9.1 | 8.5 |
| 400μm | 16.4 | 16 |
| 200μm | 31.8 | 30.7 |
| 100μm | 56.5 | 56.1 |
| 50μm | 101.2 | 101.6 |
| 30μm | X | X |

(kΩ)

TOUCH PANEL AND METHOD FOR MANUFACTURING THE SAME

CROSS-REFERENCE TO RELATED APPLICATION

This application claims priority from and the benefit of Korean Patent Application No. 10-2013-0153830, filed on Dec. 11, 2013, which is hereby incorporated by reference for all purposes as if fully set forth herein.

BACKGROUND

Field

The present invention relates to a touch panel and a method for manufacturing the same.

Discussion of the Background

A flat panel display (FPD) such as a liquid crystal display (LCD), an organic light emitting diode (OLED), or an electrophoretic display (EPD) includes a field generating electrode and an electro-optical active layer. As the electro-optical active layer, LCD may include a liquid crystal layer, OLED may include an organic emission layer, and EPD may include electrified particles. The field generating electrode may be connected to a switching element such as a thin film transistor so as to receive a data signal, and the electro-optical active layer may display an image by converting the data signal into an optical signal.

Recently, the flat panel display may include a touch sensing function that enables an interaction with a user, in addition to the image display function. According to the touch sensing function, when a user touches a screen through a finger or touch pen, the display device may sense the change of pressure, charge, or light applied to the screen, thereby obtaining touch information on whether or not the screen was touched by the object and the touch position. The display device may receive an image signal based on the touch information.

The above information disclosed in this Background section is only for enhancement of understanding of the background of the invention and therefore it may contain information that does not form the prior art that is already known in this country to a person of ordinary skill in the art.

SUMMARY

Exemplary embodiments of the present invention provide a touch panel using nanowire which is manufactured at low cost and through a simple process, and a method for manufacturing the same.

Additional features of the invention will be set forth in the description which follows, and in part will be apparent from the description, or may be learned by practice of the invention.

An exemplary embodiment of the present invention provides a touch panel including: a substrate; a first sensing electrode pattern disposed on the insulation substrate, including a plurality of first sensing electrodes, a first connection to connect the plurality of first sensing electrodes in a first direction, and a plurality of floating electrodes; and a second sensing electrode pattern including a plurality of second sensing electrodes insulated from the plurality of floating electrodes and overlapping the plurality of floating electrodes and a second connection to connect the plurality of second sensing electrodes in a second direction perpendicular to the first direction, wherein the first sensing electrode pattern includes nanowire, and the second sensing electrode pattern includes a transparent conductive material.

An exemplary embodiment of the present invention also provides a method for manufacturing a touch panel, including sequentially stacking a nanowire, an insulating layer, and a transparent conductive material over a substrate, forming a photoresist over the transparent conductive material, performing exposure and development through one mask to form a first region where no photoresist is formed, a second region where photoresist is formed at a first height, and a third region where photoresist is formed at a second height, forming a first sensing electrode and a first connection by etching the nanowire, the insulating layer, and the transparent conductive material positioned in the first region; and forming a second sensing electrode and a second connection by etching the transparent conductive material of the second region, in which the second connection is formed to have a width of 5 μm to 50 μm.

As described above, the electrode connections formed of nanowire and overlapping each other are formed at certain width or less. Thus, the wirings are formed to be disconnected without a separate etching process. Thus, the number of masks may be decreased to reduce the manufacturing cost and simplify the manufacturing process.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 12 is a table illustrating line resistance of silver nanowire according to the exemplary embodiment of the present invention.

DETAILED DESCRIPTION OF THE ILLUSTRATED EMBODIMENTS

Figure 1:
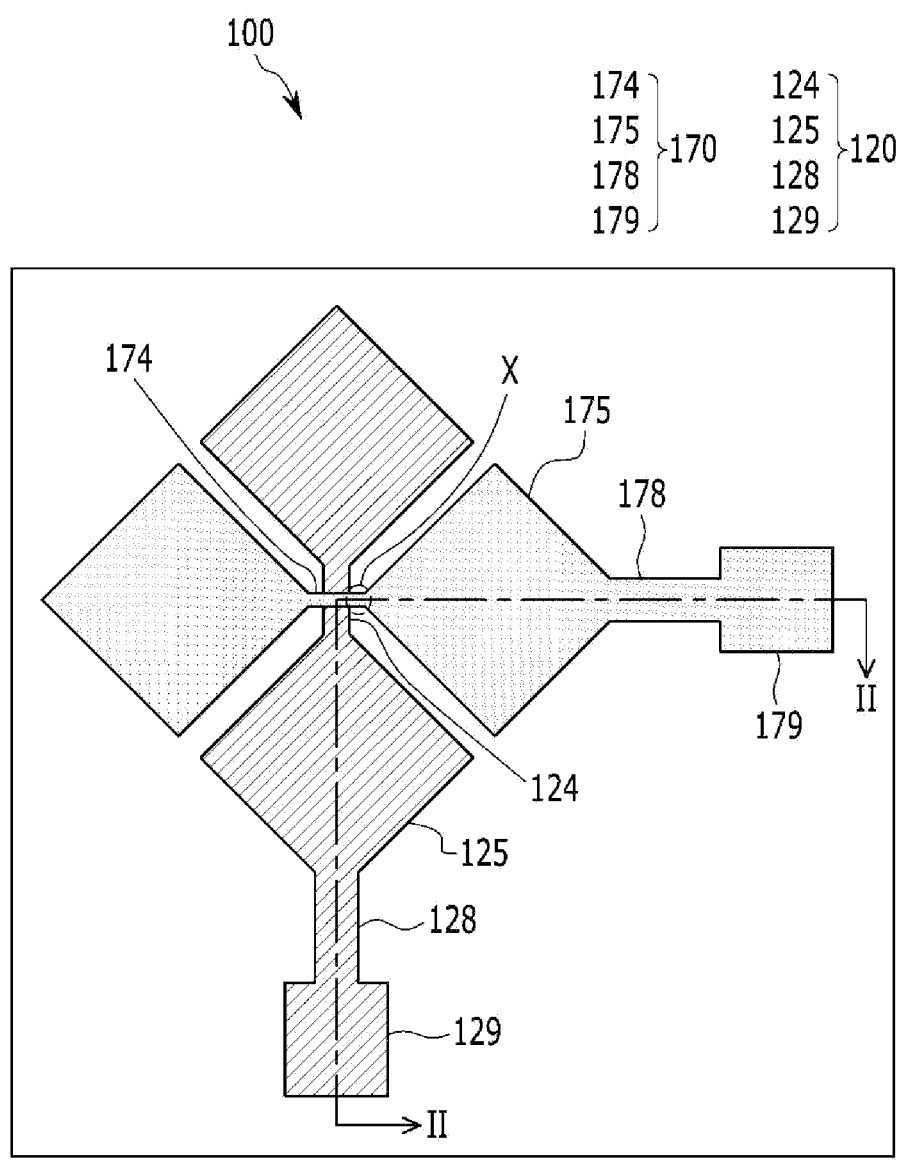
FIG. 1 is a plan view of a touch panel according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Now, a touch panel according to an exemplary embodiment of the present invention will be described in detail with reference to FIGS. 1 and 2.

FIG. 1 is a plan view of a touch panel according to an exemplary embodiment of the present invention. FIG. 2 is a cross-sectional view taken along line II-II of FIG. 1.

Figure 2:
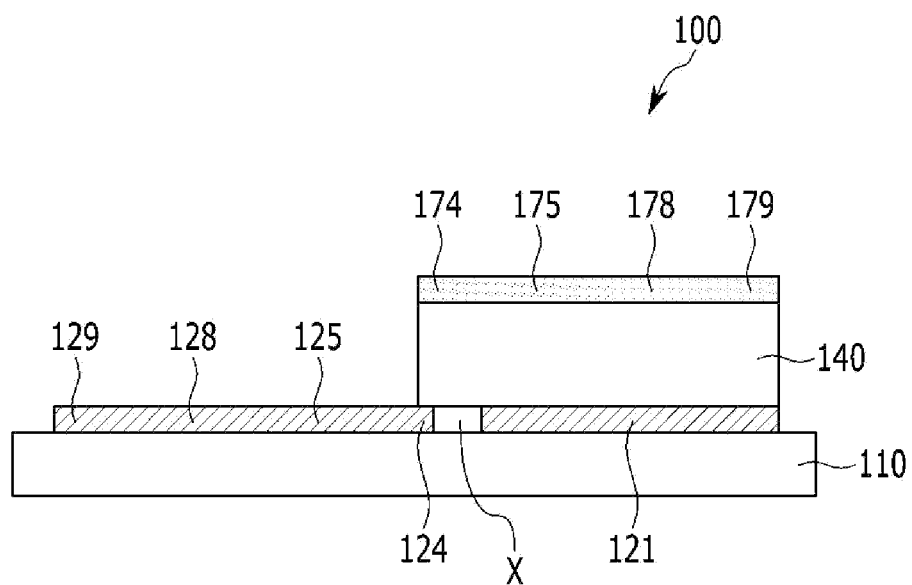
FIG. 2 is a cross-sectional view taken along line II-II of FIG. 1.

Referring to FIGS. 1 and 2, a touch panel 100 according to the exemplary embodiment of the present invention includes a first sensing electrode pattern 120 and a second sensing electrode pattern 170 which are formed on an insulation substrate 110. The first sensing electrode pattern 120 is extended in a vertical direction and includes expanded first sensing electrodes 125, and the second sensing electrode 170 is extended in a horizontal direction and includes expanded second sensing electrodes 175.

The first sensing electrode pattern 120 includes a plurality of first sensing electrodes 125, a first connection 124 for connecting the plurality of first sensing electrodes 125, a first pad 129 for connecting the first sensing electrode pattern 120 to the outside, and a first extension 128 for connecting the first pad 129 and a first sensing electrode. The first sensing electrode pattern 120 additionally includes a floating electrode 121. The floating electrode 121 is positioned to overlap the second sensing electrode 175 which senses a touch with the first sensing electrode 125. The floating electrode 121 may include a structure corresponding to a second connection 174 in addition to the second sensing electrode 175. The floating electrode 121 is electrically separated from the first sensing electrode 125, and the electrical separation is indicated by X in FIGS. 1 and 2. However, the floating electrode 121 may be electrically separated from the first sensing electrode 125 by a structure different from the structure indicated by X. In other words, the floating electrode 121 may include any structures as long as they are electrically separated from the first sensing electrode 125. As a result, the floating electrode 121 and the first sensing electrode 125 may be physically connected to each other through the first connection 124 formed in a cross shape, but electrically separated from each other. This is because the cross shape of the first connection 124 has a width in the vertical direction, wide enough that the first connection 124 is electrically connected to the floating electrode 121, but at the same time, has a width of 5 μm to 50 μm in the horizontal direction, narrow enough that the first connection 124 is electrically disconnected from the floating electrode 121. The electrical disconnection depending on width may be realized through nanowire, and will be described in detail with reference to FIG. 12. The vertical direction of the first connection 124 overlaps the second connection 174.

The first sensing electrode pattern 120 may be formed of conductive nanowire. For example, Ag nanowire (AgNW) may be used.

FIG. 1 illustrates that the first sensing electrode pattern 120 includes two first sensing electrodes 125, but the first sensing electrode pattern 120 may include various numbers of first sensing electrodes 125 depending on the size of the touch panel 100.

The first sensing electrode pattern 120 is formed on the insulation substrate 110, a part of the first sensing electrode pattern 120 is covered by an interlayer insulating layer 140, and the second sensing electrode pattern 170 is formed on the interlayer insulating layer 140. Although not illustrated, an insulating layer or passivation layer may be additionally formed on the exposed first and second sensing electrode patterns 120 and 170 so as to protect the first and second sensing electrode patterns 120 and 170 from outside.

The part of the first sensing electrode pattern 120, covered by the interlayer insulating layer 140, corresponds to parts of the floating electrode 121 and the first connection 124, overlapping the second connection 174. Depending on exemplary embodiments, however, all of the first sensing electrode pattern 120 may be covered by the interlayer insulating layer 140. At this time, the interlayer insulating layer 140 may be formed corresponding to the first sensing electrode pattern 120.

The second sensing electrode pattern 170 includes a plurality of second sensing electrodes 175, a second connection 174 for connecting the plurality of second sensing electrodes 175, a second pad 179 for connecting the second sensing electrode pattern 170 to the outside, and a second expansion 178 for connecting the second pad 179 and a second sensing electrode. The second connection 174 has a width of 5 μm to 50 μm. The floating electrode 121 may have the same boundary as the second sensing electrode 175, and may further have the same boundary as at least a part of the second connection 174.

The second sensing electrode pattern 170 may be formed of a transparent conductive material (TCO). For example, one of various transparent conductive materials such as ITO and IZO may be used.

FIG. 1 illustrates that the second sensing electrode pattern 170 includes two second sensing electrodes 175, but the second sensing electrode pattern 170 may include various numbers of second sensing electrodes 175 depending on the size of the touch panel 100.

Furthermore, FIG. 1 illustrates that one first sensing electrode pattern 120 and one second sensing electrode pattern 170 are formed, but a plurality of first and second sensing electrode patterns 120 and 170 may be formed. In other words, the plurality of first sensing electrode patterns 120, each of which may be arranged in parallel to each other and extending in the vertical direction as illustrated in FIG. 1, and the plurality of second sensing electrode patterns 170, each of which may be arranged in parallel to each other and extending in horizontal direction as illustrated in FIG. 1.

According to the exemplary embodiment of FIG. 1, the first and second sensing electrodes 125 and 175 have a diamond shape, and are arranged adjacent to each other. The respective sides of the first and second sensing electrodes 125 and 175 may be parallel to each other, while facing each other. The floating electrode 121 may be formed in a diamond shape having the same as the second sensing electrode 175, having the same boundary as the second sensing electrode 175 when seen from the top.

The first sensing electrodes 125 may be arranged in the vertical direction, and the second sensing electrodes 175 may be arranged in the horizontal direction. The first connection 124 connecting the adjacent first sensing electrodes 125 and the second connection 174 connecting the adjacent second sensing electrodes 175 overlap each other. The first connection 124 has a width equal to or larger than that of the second connection 174, and the second connection 174 has a width of 5 μm to 50 μm. The second connection 174 has a linear structure extended in the horizontal direction. The first connection 124 may have a linear structure extended in the vertical direction, and include an additional structure positioned under the second connection 174. Through the additional structure, the first connection 124 may have a cross shape.

In the above-described structure, one of the first and second sensing electrode patterns 120 and 170 may periodically receive a sensing signal, and the other may sense a touch by outputting a voltage variation based on the sensing signal.

In the touch panel according to the exemplary embodiment of the present invention, the first sensing electrode 125 formed in the vertical direction and the second sensing electrode 175 connected in the horizontal direction are formed in different layers with the interlayer insulating layer 140 interposed therebetween, but may be formed through one mask by the following manufacturing method.

Hereinafter, a manufacturing method according to an exemplary embodiment of the present invention will be described with reference to FIGS. 3 to 11.

FIGS. 3, 4, 5, 6, 7, 8, 9, 10, and 11 are diagrams sequentially illustrating a method for manufacturing a touch panel according to an exemplary embodiment of the present invention.

Figure 3:
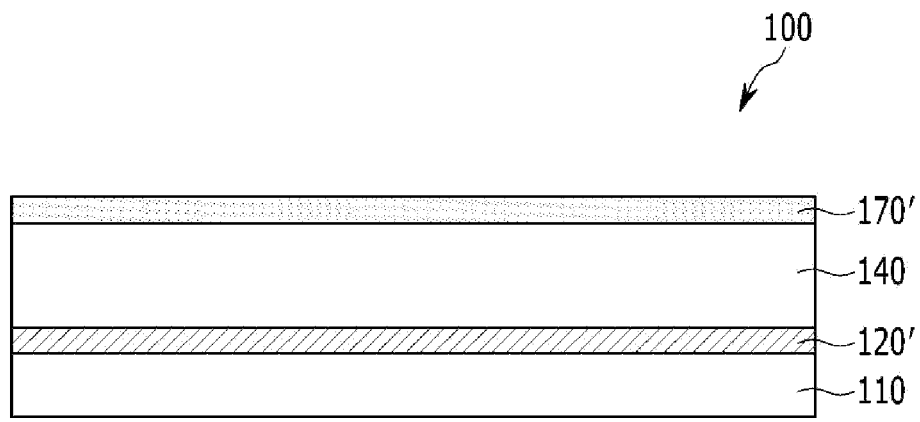
FIGS. 3, 4, 5, 6, 7, 8, 9, 10, and 11 are diagrams sequentially illustrating a method for manufacturing a touch panel according to an exemplary embodiment of the present invention.

First, as illustrated in FIG. 3, a first sensing electrode pattern material 120', an interlayer insulating layer 140, and a second sensing electrode pattern material 170' are sequentially stacked over an insulation substrate 110. The first sensing electrode pattern material 120' is formed of nanowire. In the present exemplary embodiment, the first sensing electrode pattern material 120' is formed of silver nanowire, and the second sensing electrode pattern material 170' is formed of a transparent conductive material. The interlayer insulating layer 140 may include an inorganic insulating material or organic insulating material.

Then, in order to etch the resultant structure, photoresist (PR) is formed to cover the second sensing electrode pattern material 170'.

The first sensing electrode pattern material 120', the interlayer insulating layer 140, and the second sensing electrode pattern material 170', on which the photoresist PR is stacked, are etched by being exposed and developed through one mask. The mask 500 used herein may have a slit region or a transflective region.

Figure 4:
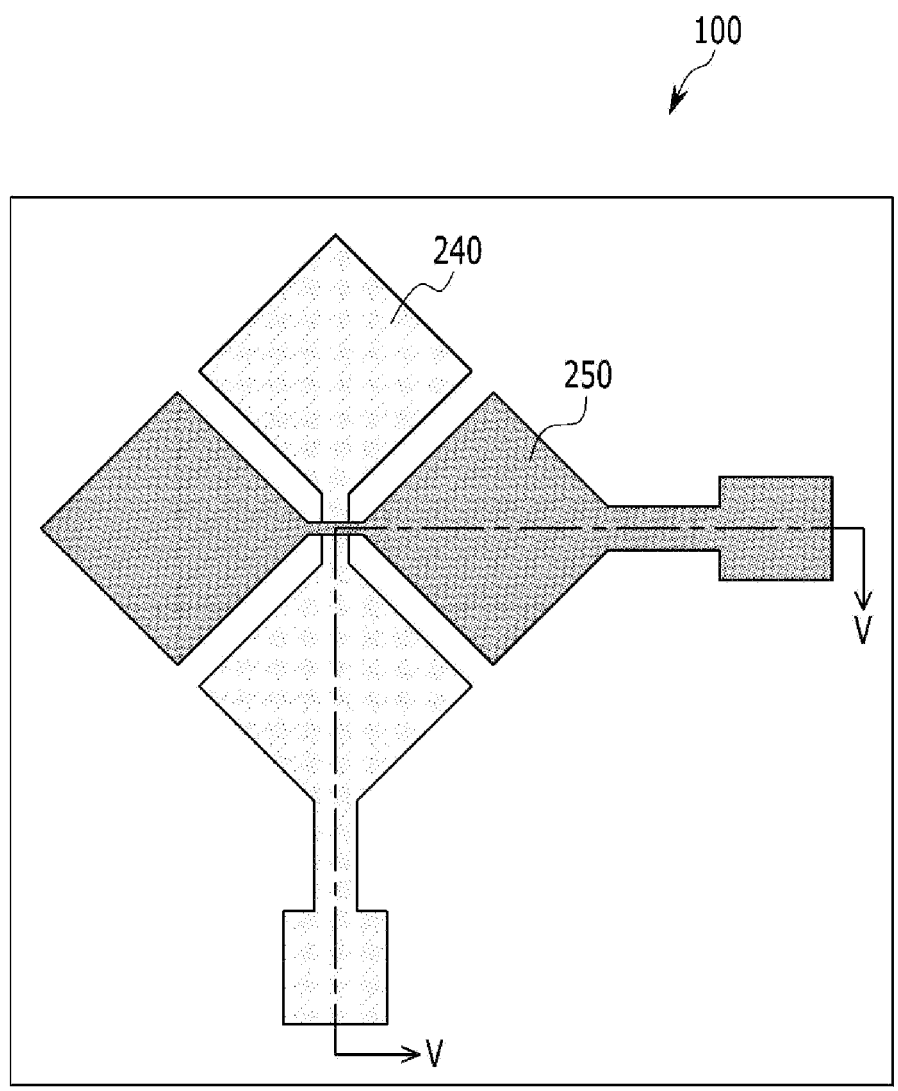
Figure 5:
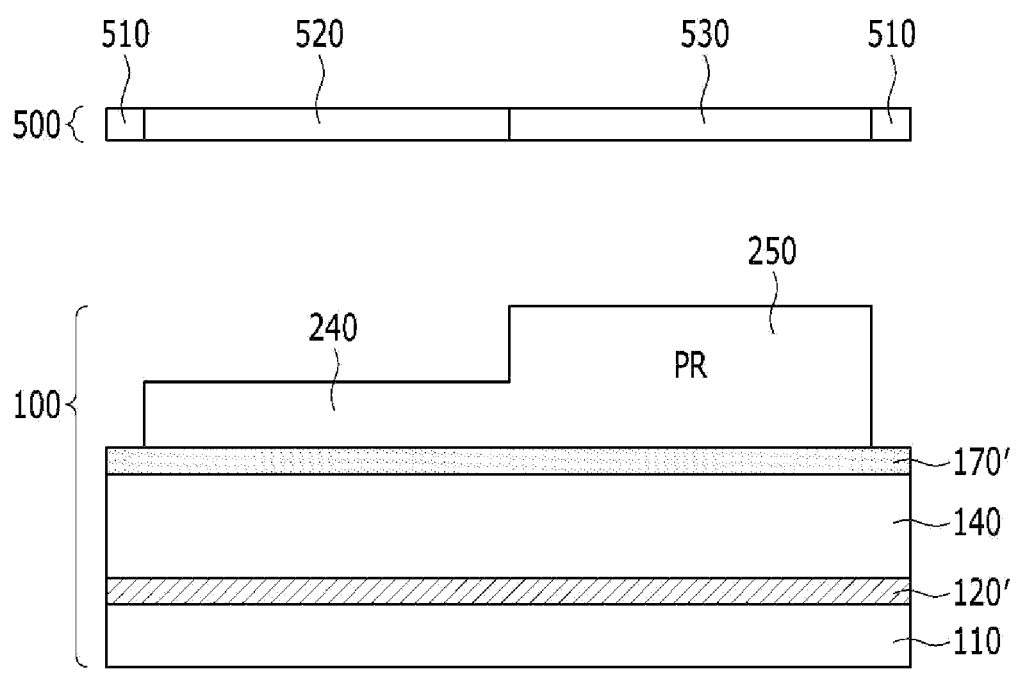

Referring to FIGS. 4 and 5, when the exposure and development is performed through one mask, first photoresist 240 having a small height is formed at a position where the first sensing electrode pattern material 120' is to be formed, and second photoresist 250 having a large height is formed at a position where the second sensing electrode pattern material 170' is to be formed. In a region where no pattern is formed, the photoresist PR is removed to expose the second sensing electrode pattern material 170'. In a region where first and second connections 124 and 174 overlap each other, the second photoresist 250 is formed. The region where no photoresist PR is formed is referred to as a first region, the region where the first photoresist 240 is formed is referred to as a second region, and the region where the second photoresist 250 is formed is referred to as a third region. The slit region or transflective region of the mask 500 corresponds to the second region. One of the first and third regions may correspond to a light shielding region, and the other region may correspond to a light transmission region. The mask 500 of FIG. 5 includes a light transmission region 510 positioned at the region corresponding to the first region, a light shielding region 530 positioned at the region corresponding to the third region, and a transflective region 520 positioned at the region corresponding to the second region.

Figure 6:
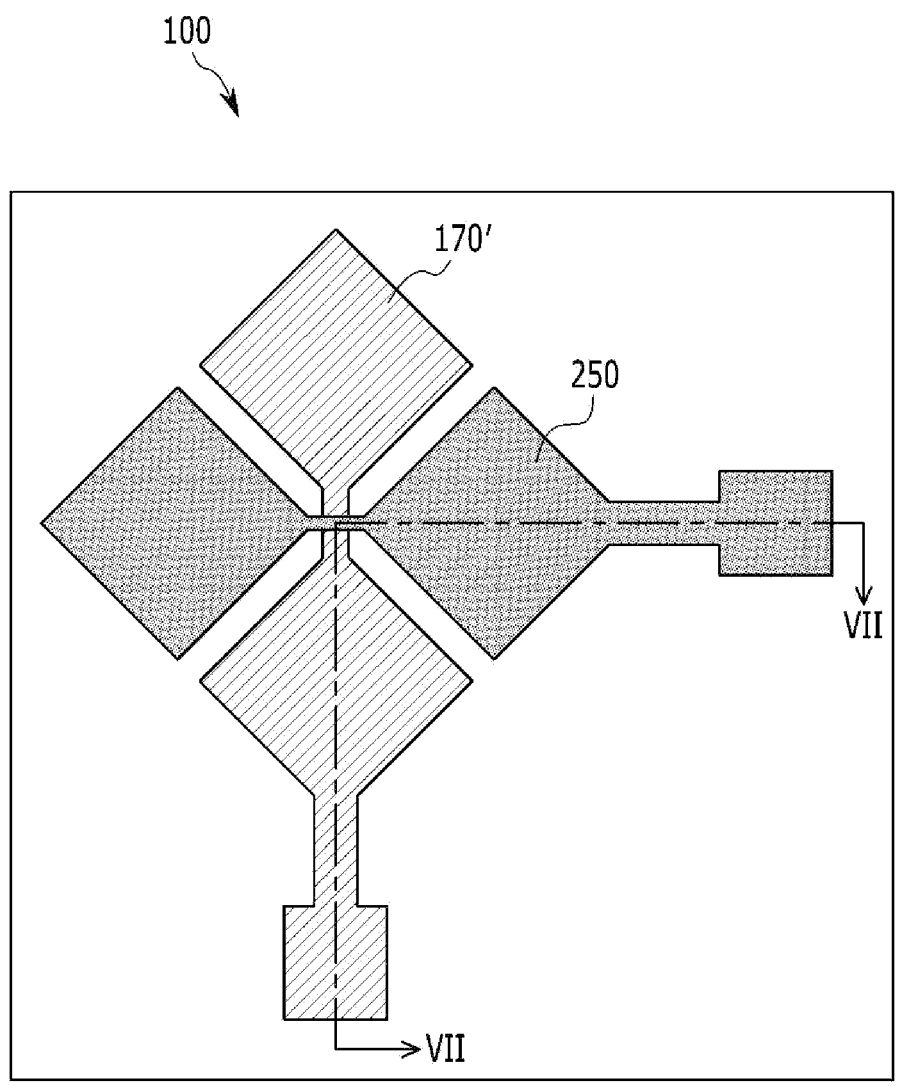
Figure 7:
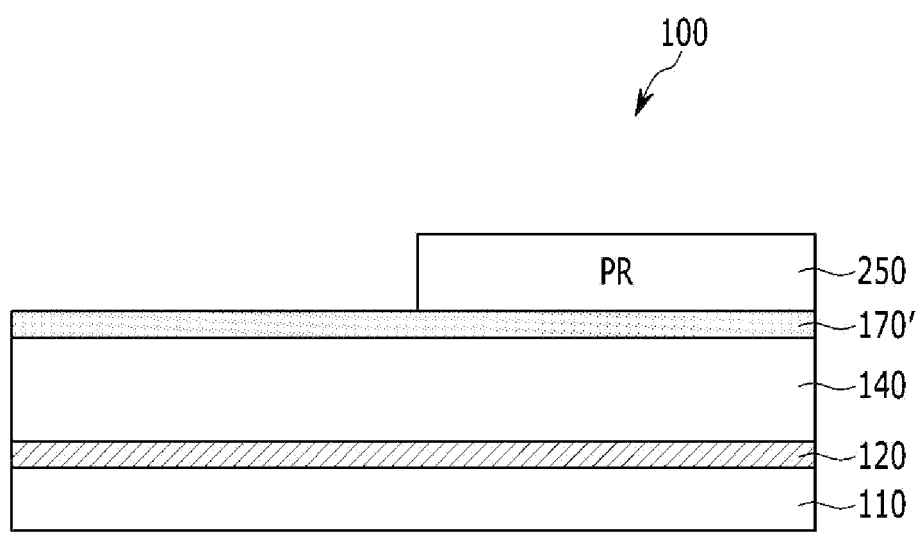

Referring to FIGS. 6 and 7, the second sensing electrode pattern material 170', the interlayer insulating layer 140, and the first sensing electrode pattern material 120', positioned at the first region where no photoresist is formed to expose the second sensing electrode pattern material 170', are removed through an etching process to form a plurality of first sensing electrodes 125 and first connections 124. At this time, the first photoresist 240 and the second photoresist 250 are formed at such a height that the first sensing electrode pattern material 120', the interlayer insulating layer 140, and the second sensing electrode pattern material 170' positioned in the other regions may not be etched. The first sensing electrode pattern material 120', the interlayer insulating layer 140, and the second sensing electrode pattern material 170' may also be etched through different methods and different etching solutions or gases.

After the etching process, a first sensing electrode pattern 120 may be completed, but may still be covered by the second sensing electrode pattern material 170'.

The first photoresist 240 may be removed to expose the second sensing electrode pattern material 170' positioned under the first photoresist 240. FIGS. 6 and 7 are respectively a layout view and cross-sectional view illustrating a state in which the first photoresist 240 is removed to expose the second sensing electrode pattern material 170'.

Figure 8:
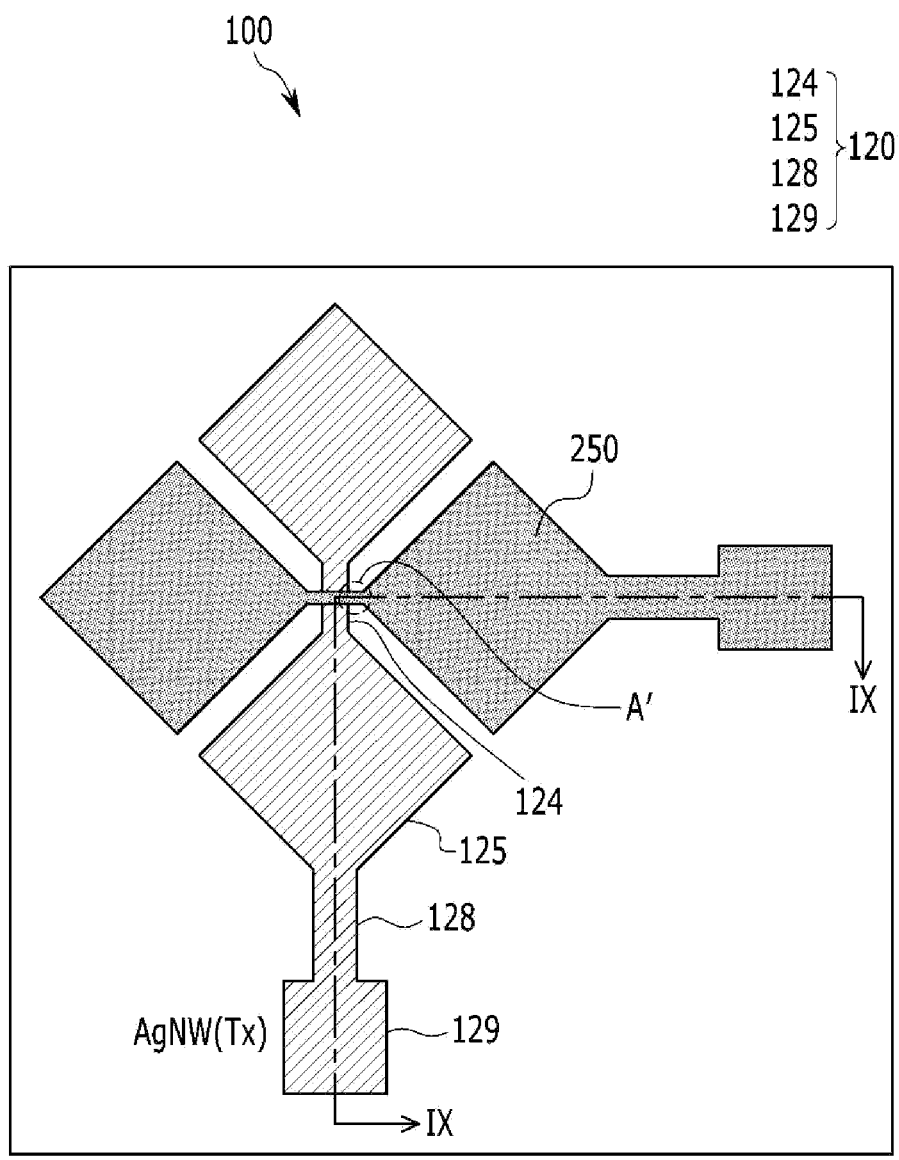
Figure 9:
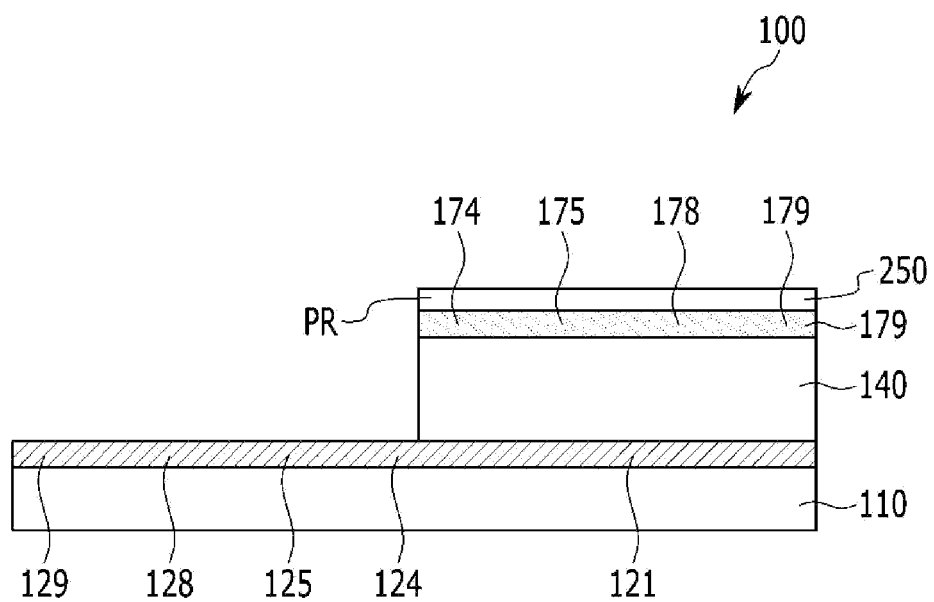

Referring to FIGS. 8 and 9, the second sensing electrode pattern material 170' and the interlayer insulating layer 140 of the second region, from which the first photoresist 240 is removed, may be removed to form a plurality of second sensing electrodes 175 and second connection 174. At this time, the plurality of first sensing electrodes 125, the plurality of first connections 124, a first pad 129, and a first extension 128 are exposed. In another exemplary embodiment, the interlayer insulating layer 140 may not be removed. A floating electrode 121 may also be formed, electrically separated from the first sensing electrode 125. The floating electrode 121 may be electrically separated from the first sensing electrode 125 when the first sensing electrode pattern material 120' having no photoresist PR is etched as illustrated in FIGS. 6 and 7. The reason why the floating electrode 121 is electrically separated from the first sensing electrode 125 will be described in detail with reference to FIG. 12.

At this time, the second photoresist 250 is formed at such a height that the second sensing electrode pattern material 170' is not etched.

Through the etching process of FIGS. 8 and 9, a second sensing electrode pattern 170 is completed, but covered by the second photoresist 250.

Figure 10:
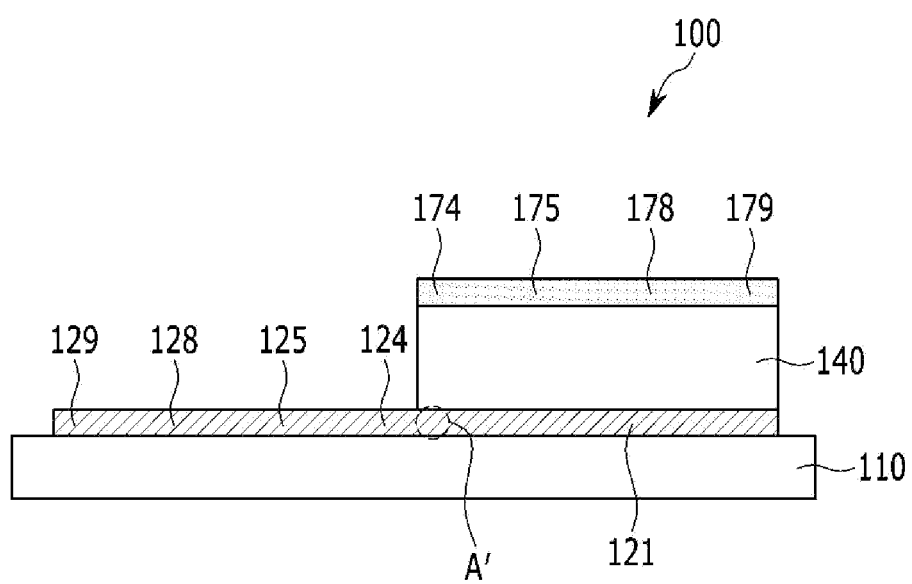

Referring to FIG. 10, the second photoresist 250 positioned in the third region is removed to expose the completed second sensing electrode pattern 170.

The second sensing electrode pattern 170 includes the plurality of second sensing electrodes 175, the plurality of second connections 174, a second pad 179, and a second extension 178. The second connection 174 has a width of 5 μm to 50 μm.

In the touch panel 100 formed through the above-described process, the first sensing electrode 125 and the floating electrode 121 may be electrically separated from each other. That is because, when the above-described process is applied, the pattern formed by the first sensing electrode pattern material 120' includes the pattern formed by the second sensing electrode pattern material 170' (refer to portion A' of FIG. 10). Thus, if the portion A' of FIG. 10 corresponding to X of FIGS. 1 and 2 is not electrically disconnected, the first sensing electrodes 125 are electrically connected in the horizontal direction by the floating electrode 121 as illustrated at the top of FIG. 11, and signal may be transmitted to all of the first sensing electrodes 125, thereby making it difficult to perform touch sensing.

Figure 11:
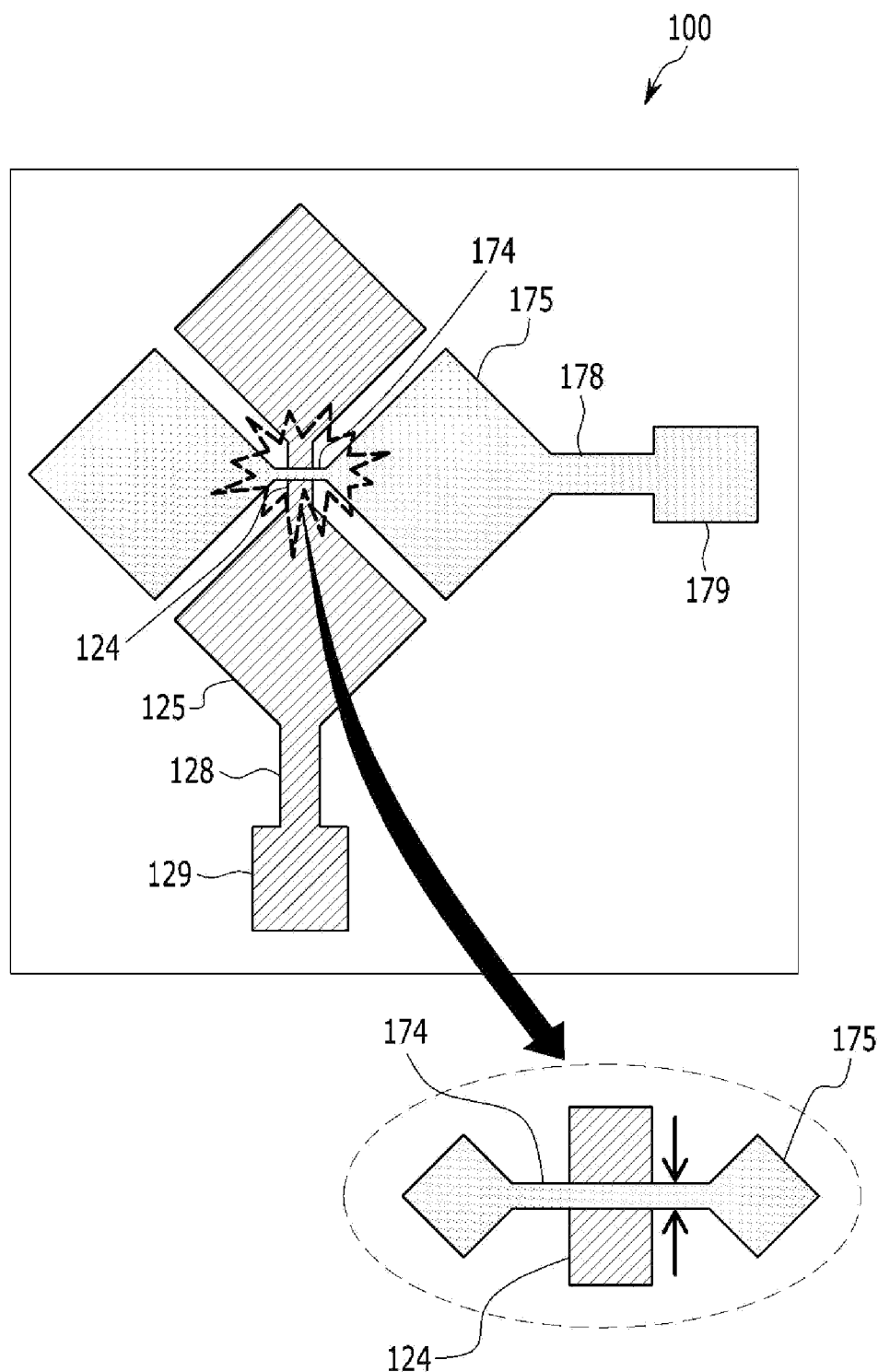

According to an exemplary embodiment of the present invention, the width of the second connection 174 may be reduced to certain level or less, as illustrated in the bottom of FIG. 11. The reduction may be achieved by the first sensing electrode pattern material 120' formed of nanowire.

Specifically, the nanowire may form one pattern by disorderly arranged nano-size wires. The nano-size wires are disorderly arranged in the nanowire, providing the nanowire with an arrangement structure that has high resistance or forbid transmission of current or voltage at certain width or less. In other words, even with the disorderly arranged structure of nano-size wires, nanowire may transmit a current or voltage from one side to the other side at more than certain width. However, the disorderly arrangement of the nanowire is not suitable for transmitting current or voltage at certain width or less. Thus, the nanowire may have high resistance or may be electrically disconnected under certain width.

In the exemplary embodiment of the present invention, the above-described characteristics of the nanowire have been tested through silver nanowire (AgNW).

FIG. 12 is a table illustrating line resistance of AgNW line according to the exemplary embodiment of the present invention.

In the test of FIG. 12, AgNW was formed through two methods; a method using a silver print, and a method using no silver print. The sheet resistance of AgNW used in the test is 80 ohms/square.

Referring to FIG. 12, as the width of AgNW line is decreased, the resistance value of the AgNW line increases. At a width of 50 μm, the resistance value of the AgNW line exceeds 101 kΩ. When the resistance value exceeds 100 kΩ, no current or voltage may be transmitted through the AgNW nanowire due to the high resistance, even when the touch panel 100 is formed at a large size. Thus, the AgNW line may effectively be electrically disconnected. Furthermore, no current is passed at a width of 30 μm, indicating that the AgNW line is electrical disconnected.

In the exemplary embodiment of the present invention, a width of the connection between the floating electrode 121 and the first sensing electrode 125 formed of AgNW is set to 50 μm or less. Therefore, no signal may be substantially applied to the floating electrode 121 due to high resistance, or even further, the floating electrode 121 may be electrically disconnected.

According to the exemplary embodiment of the present invention, the first sensing electrode pattern may have a structure in which the floating electrode and the first sensing electrode are connected to each other. However, electricity may not flow to the floating electrode. The floating electrode 121 and the first sensing electrode 125 may be physically connected to each other through the first connection 124 having a cross shape. The first connection 124 having a cross shape includes a part overlapping the second connection 174, and the width of the part overlapping the second connection 174 is set to 50 μm or less.

In FIG. 12, the AgNW used for the test have a sheet resistance of 80 ohms/square. However, when the sheet resistance decreases, the width must be reduced to achieve electrical disconnection, and when the sheet resistance increases, electrical disconnection may be achieved even when the width is increased. When AgNW having a sheet resistance between 50 ohms/square and 80 ohms/square is used, the width of the AgNW line may be set in the range of between 5 μm and 50 μm. The width is set to 5 μm or more because the corresponding second connection 174 formed of a transparent conductive material needs to electrically connect the second sensing electrodes 175 at a certain resistance or less. Since AgNW line having a larger sheet resistance may be disconnected at a width of 50 μm, electrical disconnection may be sufficiently achieved at a width of 50 μm or less.

In the exemplary embodiment of the present invention, AgNW was used. However, another nanowire may be used. At this time, the width of the second connection 174 may be set differently according to the material used.

Hereinafter, various exemplary embodiments according to the pad position of the touch panel 100 will be described with reference to FIGS. 13, 14, 15, and 16.

Figure 13:
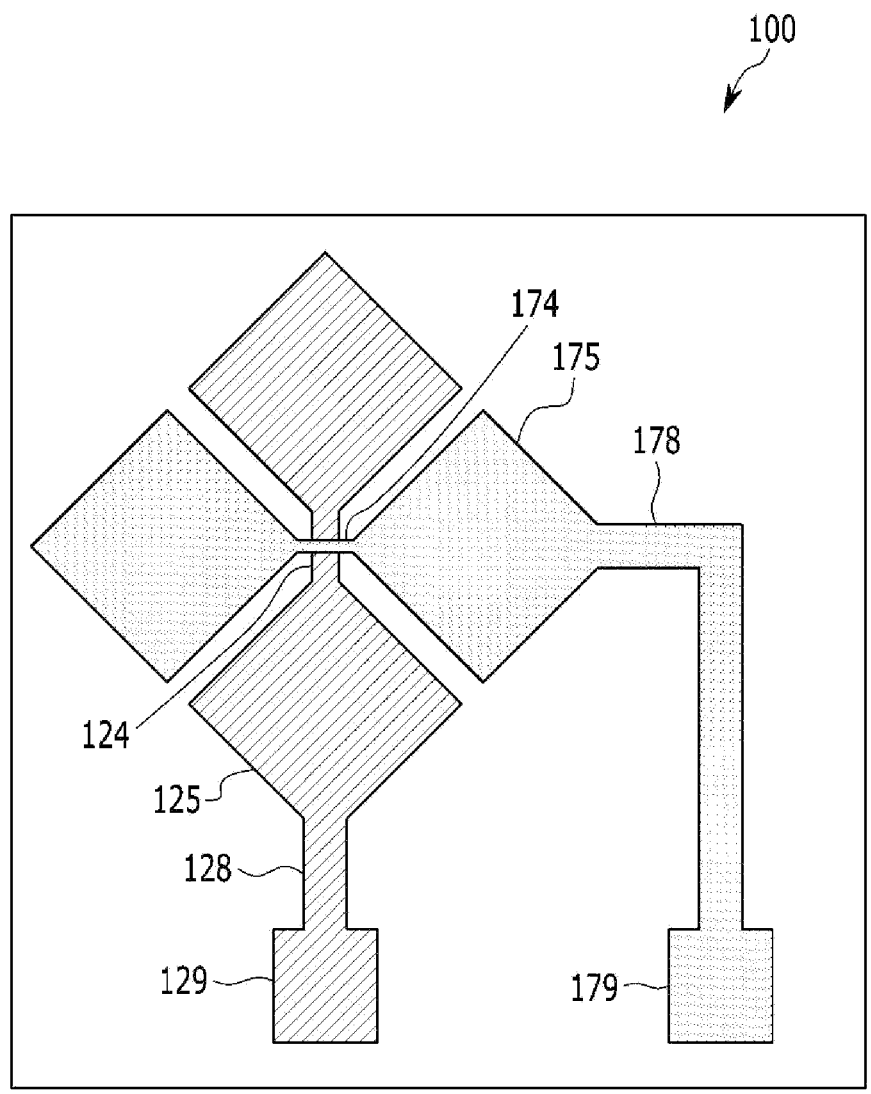
FIG. 13 is a plan view of a touch panel according to another exemplary embodiment of the present invention.

FIG. 13 is a plan view of a touch panel according to an exemplary embodiment of the present invention.

Referring to FIG. 13, the second pad 179 is positioned adjacent to the same side as the first pad 129 in the touch panel 100, unlike the structure illustrated in FIG. 1.

Referring back to FIG. 1, the touch panel 100 had the first pad 129 positioned adjacent to the bottom side, and the second pad 179 positioned adjacent to the right side.

The exemplary embodiment of FIG. 13, on the other hand, has the second extension 178 extended in the right side and then bent downward, and the second pad 179 positioned at the bottom side.

The exemplary embodiments of FIGS. 1 and 13 are different from each other depending on through which side of the touch panel 100 a signal is applied to the first or second sensing electrode 125 or 175.

In general, the touch panel 100 includes a driving unit and a sensing unit which are attached thereto. The driving unit applies a periodic pulse signal, and the sensing unit senses a touch by transmitting an output voltage swung by the pulse signal. The exemplary embodiments of FIGS. 1 and 13 are different from each other in the attachment positions of the driving unit and the sensing unit.

That is, in the exemplary embodiment of FIG. 1, the sensing unit and the driving unit are attached to the bottom and right sides of the touch panel 100, respectively. On the other hand, in the exemplary embodiment of FIG. 13, the sensing unit and the driving unit are all attached to the bottom side of the touch panel 100.

Hereinafter, the connection relation of wirings to connect the touch panel 100 to the sensing unit or driving unit will be described with reference to FIGS. 14 to 16.

Figure 14:
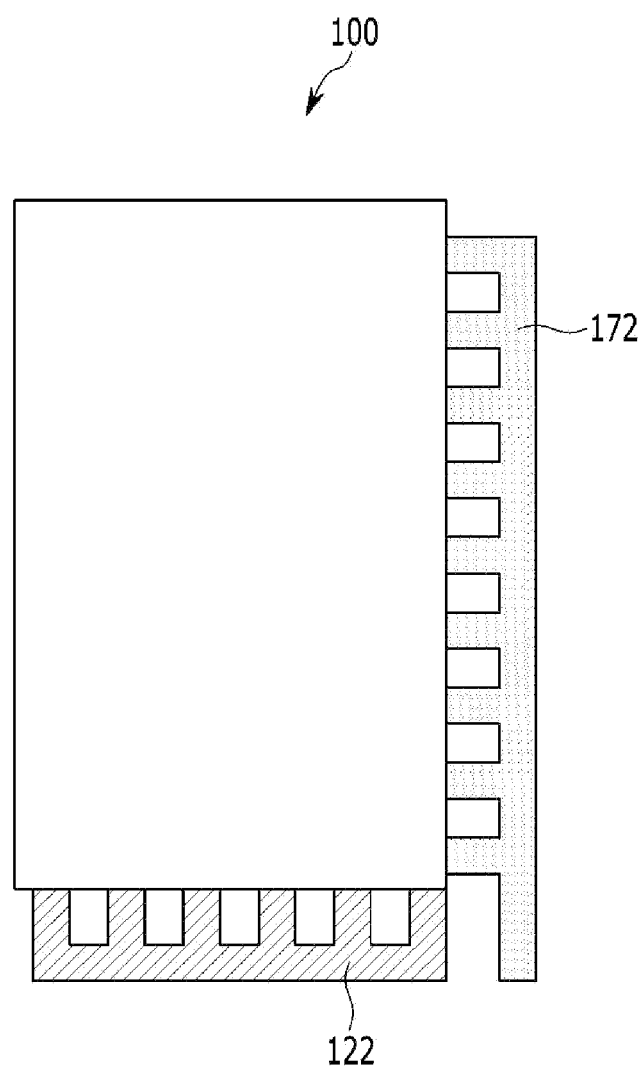
FIGS. 14, 15 and 16 are diagrams illustrating the connection positions of a signal application wiring and a sensing wiring in the touch panel according to the exemplary embodiment of the present invention.
Figure 15:
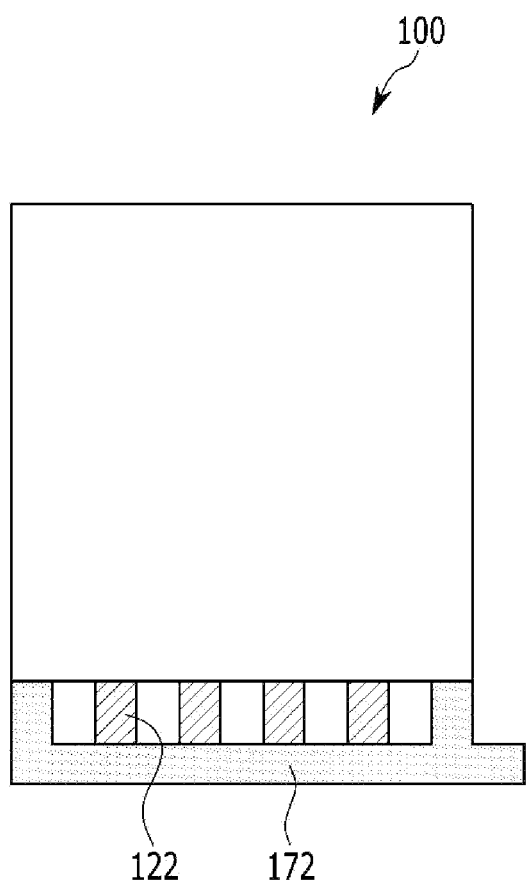
Figure 16:
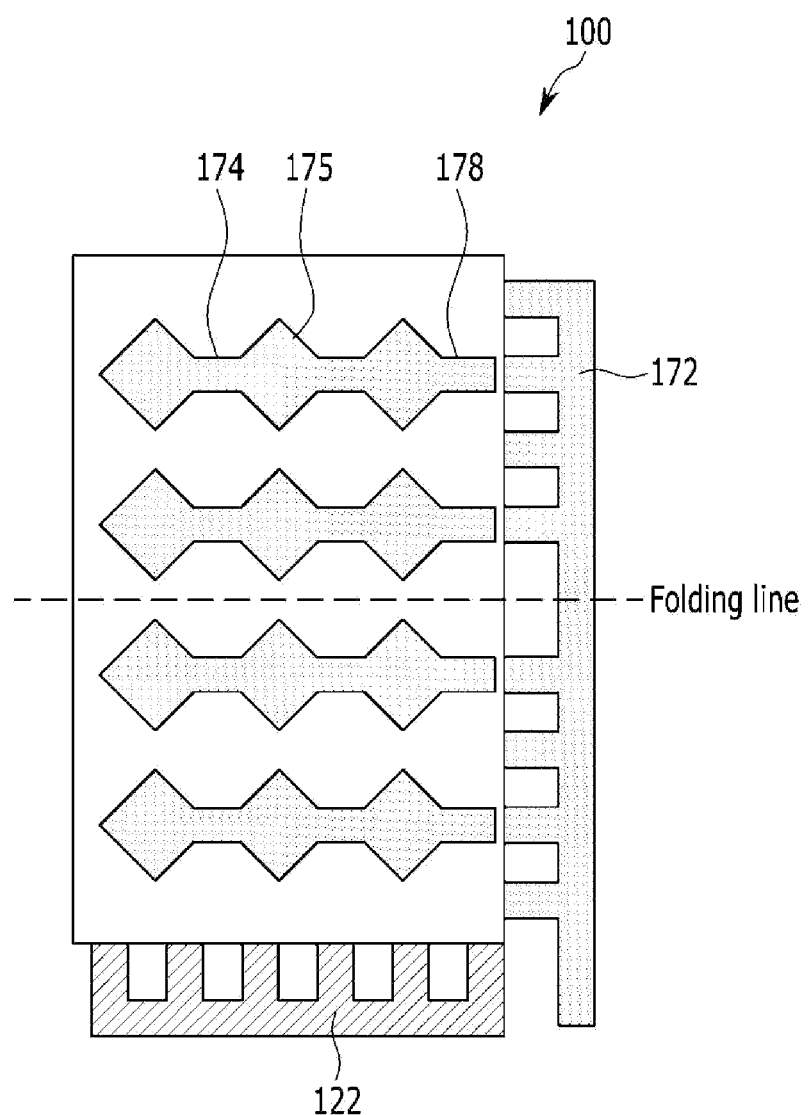

FIGS. 14, 15, and 16 are diagrams illustrating the connection positions of a signal application wiring and a sensing wiring in the touch panel according to the exemplary embodiment of the present invention.

First, FIG. 14 will be described.

FIG. 14 illustrates a signal application wiring 122 connected to the driving unit and a sensing wiring 172 connected to the sensing unit. Accordingly, the signal application wiring 122 is connected to the first pad 129, and the sensing wiring 172 is connected to the second pad 179.

In the exemplary embodiment of FIG. 14, the first pad 129 is positioned adjacent to the bottom side, but the second pad 129 is positioned adjacent to the right side, like the exemplary embodiment of FIG. 1. As a result, the signal application wiring 122 to apply a pulse signal is disposed at the bottom side of the touch panel 100, and the sensing wiring 172 is disposed at the right side.

In the exemplary embodiment of FIG. 14, the signal application wiring 122 is electrically connected to the first sensing electrode 125, and the sensing wiring 172 is electrically connected to the second sensing electrode 175.

In an exemplary embodiment of FIG. 15, the first pad 129 and the second pad 179 are positioned adjacent to the bottom side, like the exemplary embodiment of FIG. 13. Thus, both of the signal application wiring 122 and the sensing wiring 172 are disposed at the bottom side of the touch panel 100.

Unlike the exemplary embodiments of FIGS. 14 and 15, an exemplary embodiment may have the first sensing electrode 125 connected to a sensing wiring. At this time, the first sensing electrode 125 may be connected to the sensing unit. Accordingly, the second sensing electrode 175 may be connected to a signal application wiring. The second sensing electrode 175 may be connected to the driving unit.

FIGS. 14 and 15 illustrate that the signal application wiring 122 or the sensing wiring 172 is connected to the touch panel 100 at a plurality of protrusions, and the plurality of protrusions is connected through one wiring. However, each of the plurality of protrusions may be separately connected to the driving unit or sensing unit to receive an individual signal.

FIG. 16 illustrates a flexible touch panel 100.

Referring to FIG. 16, the insulation substrate 110 of the touch panel 100 of FIG. 16 may be formed of a flexible material such as plastic.

In FIG. 16, a folding part in the flexible touch panel 100 is indicated by a dotted line. The dotted line may be referred to as a folding line. FIG. 16 illustrates a structure in which the flexible touch panel 100 is not freely folded at various positions, but the folding part is limited to a certain part.

When the second sensing electrode pattern 170 including the second sensing electrodes 175 in the touch panel 100 of FIG. 16 is formed of a transparent conductive material, it may be disconnected when the touch panel 100 is folded. However, since the first sensing electrode pattern 120 including the first sensing electrodes 125 of the exemplary embodiment of the present invention is formed of nanowire, the first sensing electrode pattern 120 may have elasticity and may not be disconnected even when the first sensing electrode pattern 120 is folded, which makes the touch panel 100 a flexible touch panel 100. The folding line of the touch panel 100 may not overlap the second sensing electrode pattern 170.

Thus, when the flexible touch panel 100 is formed, the directions of the first and second sensing electrode patterns 120 and 170 may be controlled depending on the folding direction of the touch panel 100.

Further referring to the FIG. 16, the signal application wiring 122 may be disposed at the bottom side of the touch panel 100 and the sensing wiring 172 may be disposed at the right side of the touch panel 100, like the exemplary embodiment of FIG. 14. Depending on exemplary embodiments, however, both of the signal application wiring 122 and the sensing wiring 172 may be disposed at the bottom side of the touch panel 100 as illustrated in FIG. 15.

The touch panel 100 according to the various exemplary embodiments of the present invention may be included in a display device. The structure of the display device will be described with reference to FIG. 17.

Figure 17:
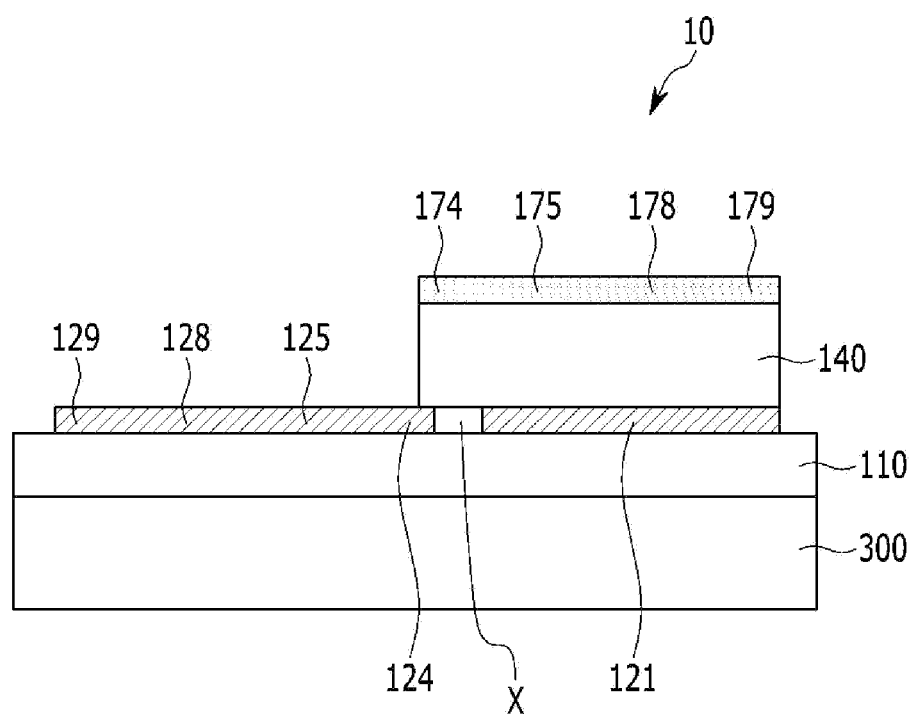
FIG. 17 is a cross-sectional view illustrating a touch panel and a display panel according to an exemplary embodiment of the present invention.

FIG. 17 is a cross-sectional view illustrating a touch panel and a display panel according to an exemplary embodiment of the present invention.

FIG. 17 illustrates a display device 10 including a display panel 300, which is attached under the touch panel 100 of FIG. 1. The display panel 300 may include various flat display panels such as a liquid crystal panel and an organic light emitting panel or a flexible display panel.

FIG. 17 illustrates that the first and second sensing electrode patterns 120 and 170 of the touch panel 100 are exposed. However, the first and second sensing electrode patterns 120 and 170 may be covered by a passivation layer or film and be protected from outside.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A touch panel comprising:
    a substrate;
    a first sensing electrode pattern disposed on the insulation substrate, comprising a plurality of first sensing electrodes, a first connection to connect the plurality of first sensing electrodes in a first direction, and a plurality of floating electrodes; and
    a second sensing electrode pattern comprising a plurality of second sensing electrodes insulated from the plurality of floating electrodes and overlapping the plurality of floating electrodes and a second connection to connect the plurality of second sensing electrodes in a second direction perpendicular to the first direction,
    wherein the first sensing electrode pattern comprises nanowire,
    wherein the second sensing electrode pattern comprises a transparent conductive material,
    wherein the second connection has a width of 5 μm to 50 μm,
    wherein the nanowire is silver nanowire, and the silver nanowire has a sheet resistance of 50 ohms/square to 80 ohms/square,
    wherein the first connection has a cross shape, and a part of the first connection that is connected to the floating electrode has a width of 5 μm to 50 μm, and
    wherein the floating electrode is electrically separated from the first connection.

2. The touch panel of claim 1, further comprising an interlayer insulating layer covering at least a part of the first sensing electrode pattern and disposed under the second sensing electrode pattern.

3. The touch panel of claim 2, wherein the interlayer insulating layer further covers parts of the floating electrode and the first connection in the first sensing electrode pattern that overlaps the second connection.

4. The touch panel of claim 1, wherein the first sensing electrode and the second sensing electrode are formed in a diamond shape, and
    the sides of the first and second sensing electrodes are disposed in parallel to each other, while facing each other.

5. The touch panel of claim 4, wherein the floating electrode is formed in a diamond shape having the same size as the second sensing electrode.

6. The touch panel of claim 5, wherein the first sensing electrode pattern further comprises a first pad connecting the first sensing electrode pattern to the outside and a first extension connecting the first pad and the first sensing electrode, and the second sensing electrode pattern further comprises a second pad connecting the second sensing electrode pattern to the outside and a second extension connecting the second pad and the second sensing electrode.

7. The touch panel of claim 6, wherein the first and second pads are positioned adjacent to different sides of the touch panel.

8. The touch panel of claim 6, wherein the first and second pads are positioned adjacent to the same side of the touch panel.

9. The touch panel of claim 6, further comprising:
a signal application wiring connected to the first pad; and
a sensing wiring connected to the second pad.

10. The touch panel of claim 1, wherein the substrate is formed of flexible material, and the substrate is folded along a folding line, wherein the direction of the folding line is perpendicular to the first direction and the folding line does not overlap the second sensing electrode pattern.

11. A method for manufacturing a touch panel, comprising:

sequentially stacking a nanowire, an insulating layer, and a transparent conductive material over a substrate;

forming a photoresist over the transparent conductive material;

performing exposure and development through one mask to form a first region where no photoresist is formed, a second region where photoresist is formed at a first height, and a third region where photoresist is formed at a second height;

forming a first sensing electrode and a first connection by etching the nanowire, the insulating layer, and the transparent conductive material positioned in the first region; and forming a second sensing electrode and a second connection by etching the transparent conductive material of the second region, wherein the second connection is formed to have a width of 5 μm to 50 μm, wherein the nanowire comprises silver nanowire, and the silver nanowire has a sheet resistance of 50 ohms/square to 80 ohms/square, wherein the forming of the first sensing electrode and the first connection further comprises forming a floating electrode, wherein the first connection has a cross shape, and a part of the first connection that is connected to the floating electrode has a width of 5 μm to 50 μm, and wherein the floating electrode is electrically disconnected from the first connection.

12. The method of claim 11, wherein the one mask comprises a slit region or transflective region.

13. The method of claim 12, wherein the slit region or transflective region of the one mask corresponds to the second region, and one of the first and third regions corresponds to a light shielding region, and the other corresponds to a light transmission region.

* * * * *